United States Patent [19]

Imaeda et al.

[11] Patent Number: 5,256,242
[45] Date of Patent: Oct. 26, 1993

[54] METHOD OF MANUFACTURING FERRITE CRYSTALS

[75] Inventors: Minoru Imaeda; Emi Asai; Katsunori Okamoto, all of Nagoya, Japan

[73] Assignee: NGK Insulators, Ltd., Japan

[21] Appl. No.: 516,907

[22] Filed: Apr. 30, 1990

[30] Foreign Application Priority Data

Apr. 28, 1989 [JP] Japan .................................. 1-107791
Apr. 28, 1989 [JP] Japan .................................. 1-107792
Aug. 29, 1989 [JP] Japan .................................. 1-220178
Aug. 29, 1989 [JP] Japan .................................. 1-220179
Apr. 20, 1990 [JP] Japan .................................. 2-103194
Apr. 20, 1990 [JP] Japan .................................. 2-103195

[51] Int. Cl.$^5$ ............................................. C04B 35/26
[52] U.S. Cl. ........................... 156/603; 156/DIG. 73; 156/DIG. 74; 252/62.57; 264/65; 264/570; 501/126
[58] Field of Search ............... 264/65, 570; 252/62.57; 501/126; 156/603, DIG. 73, DIG. 74

[56] References Cited

U.S. PATENT DOCUMENTS 3,853,973 12/1974 Härdtl .................................. 264/65
4,552,710 11/1985 Rigby et al. ....................... 264/65

FOREIGN PATENT DOCUMENTS 0105122 4/1984 European Pat. Off. .
3529756 2/1986 Fed. Rep. of Germany .
61-1391 1/1986 Japan .
63-35490 2/1988 Japan .
63-35496 2/1988 Japan .
63-163815 7/1988 Japan .

OTHER PUBLICATIONS

Derwent Accession No. 87-139 599, Questel Telesystems (WPIL) Derwent Publications Ltd., London.
Derwent Accession No. 88-81 758, Questel Telesystems (WPIL) Derwent Publications Ltd., London.

*Primary Examiner*—James Derrington
*Attorney, Agent, or Firm*—Parkhurst, Wendel & Rossi

[57] ABSTRACT

A method of manufacturing ferrite crystals such as single crystal bodies and polycrystal bodies with garnet structure is disclosed, which includes the steps of effecting a composition controlling for raw powders, forming raw powders, sintering formed bodies and effecting hot isostatic press treatment for sintered bodies. Also, a method of producing ferrite powders preferably used for the ferrite crystal manufacturing method mentioned above.

The thus obtained ferrite crystal bodies with garnet structure show good magnetooptical properties such as light transmissivity, Faraday rotation angle and Verdet constant, and are preferably used for magnetooptical elements such as optical isolators and optical magnetic field sensors etc.

7 Claims, 1 Drawing Sheet

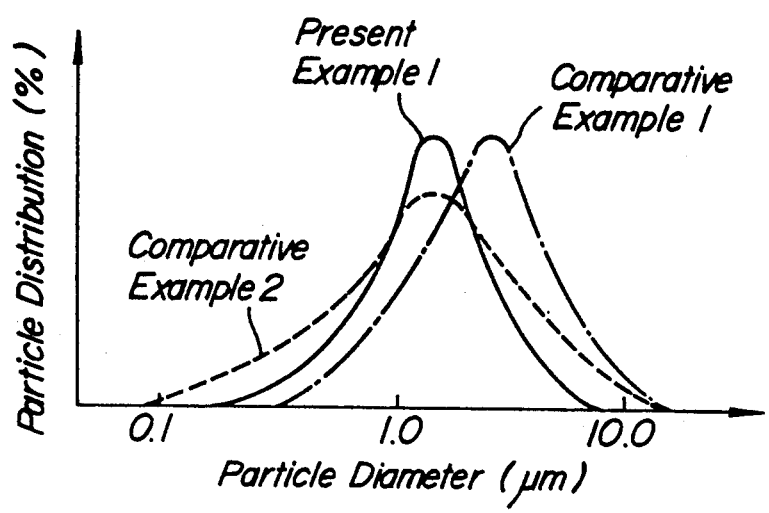
FIG_1

METHOD OF MANUFACTURING FERRITE CRYSTALS

BACKGROUND OF THE INVENTION

1. Field of the Invention

The present invention relates to a method of manufacturing transparent ferrite crystals with garnet structure for us in magnetooptical elements such as optical isolators, optical magnetic field sensors, and the like, a method of producing ferrite powders preferably used therefor.

2. Related Art

The ferrite crystals with garnet structure have a composition of Y: 37.5 mol % and Fe: 62.5 mol % in which a part of Y or Fe may be substituted by other elements if necessary. As for the ferrite crystals with garnet structure for use in magnetooptical elements, ferrite single crystal bodies and ferrite polycrystal bodies were used.

Up to this time, there have been known various methods o manufacturing ferrite single crystal bodies in which a mother single crystal body was connected to a polycrystal body and a heat treatment was performed thereto to grow a ferrite single crystal into a ferrite polycrystal body, as shown in Japanese Patent Publication No. 61-1391 and in Japanese Patent Laid-Open Publication No. 63-35490.

However, in the single crystal manufacturing method mentioned above, if an amount of Fe (when a part of Fe is substituted by other elements, the other element is converted into Fe amount) is in less of an object amount of 62.5 mol %, there is a drawback such that a growth of single crystal is not promoted at all. Further, an in Fe rich state, second phases remain in the single crystal. Therefore, according to the method mentioned above, a stable single crystal growth can not be performed.

Also, in the field of manufacturing ferrite polycrystals of garnet structure, there has been known a technique for making polycrystal bodies transparent, as shown in Japanese Patent Laid-Open Publication No. 63-163815. That is to say, in the technique mentioned above, at first Ca is added in raw materials so as to reduce pores in the polycrystal bodies and to make the light absorption coefficient thereof substantially equal to that of single crystal bodies, and then V, and the like are added in raw materials so as to neutralize valence in the polycrystal bodies.

In the ferrite manufacturing method mentioned above, a light transmissivity becomes good, but magnetooptical properties such as Faraday rotation angle and Verdet constant become bad since Ca is added. Moreover, since the number of added elements is increased, there is a drawback such that an evenness of sintered bodies is deteriorated. Further, in the polycrystal bodies, a liquid phase is easily generated therein due to an existence of Ca element, and thus single crystallizations are not promoted by the known method mentioned above.

Further, as for a method of producing ferrite powder preferably used for the ferrite crystal manufacturing method mentioned above, there has been known a powder mixing method and a wet coprecipitation method.

In the known powder mixing method, raw materials such as oxides or carbonates both having a predetermined composition are mixed, and the mixed compounds are calcined and crushed to obtain ferrite powders with garnet structure. Moreover, in the known wet co-precipitation method, base solutions are added to raw solutions of nitrate of metals or sulfate of metals to coprecipitate hydroxides, and the hydroxides are washed and filtered. Then, the filtered hydroxides are dried up, calcined and crushed to obtain ferrite powders with garnet structure.

In the known powder method, since garnets are generated due to a solid-phase reaction between raw material particles and for example YI (yttrium-iron-garnet) is generated at high temperatures more than 1200° C., grain growths are generated and thus particle diameters after crushing become large. Therefore, there is a drawback such that sufficient sintering density can not be obtained. Further, in the case that ferrite garnet powders a part of which is substituted by bismuth are produced, since the bismuth component is volatilized at temperatures at which a solid-phase reaction between raw material particles occurs, there is a drawback such that garnet powders having a predetermined composition can not be obtained.

In the known wet coprecipitation method, since hydroxides are directly obtained from mixing solutions including metal ions, it is possible to mix solutions in atomic order in the case of producing YIG, and thus fine garnet powders can be obtained by calcining at temperatures more than 900° C. However, when use is made of ferric solutions including ferric ion as raw materials, generated coprecipitation powders become very fine, and a particle distribution of the coprecipitation powders after calcining become very broad and thus the powders have insufficient sintering density. Therefore, there is a drawback such that it is not possible to obtain ferrite crystals with garnet structure having sufficient properties from the powders mentioned above.

Further, in the case that ferrite garnet powders a part of which is substituted by bismuth are produced, if hydroxides are generated from solutions including nitrate ion or sulfate ion of iron etc. by using the coprecipitation reaction, garnetization (the change of the hydroxide powders into the garnet phase) does not occur at low temperatures due to an absorption of these ions, and thus it is necessary to make calcining temperatures at above 900° C. Therefore, when a larger amount of Y is substituted by bismuth, sulfuric acid components and hydrochloric acid components can not be completely decomposed, and thus the ferrite powders having good formability can not be obtained.

SUMMARY OF THE INVENTION

An object of the invention is to eliminate the drawbacks mentioned above and to provide a method of manufacturing transparent ferrite polycrystals and single crystals with garnet structure having good light transmissivity and good magnetooptical properties such as Faraday rotation angle and Verdet constant.

According to the invention, a method of manufacturing ferrite crystals with garnet structure by forming raw powders to obtain formed bodies and sintering the formed bodies, comprises the steps of, effecting a composition controlling for the raw powders to obtain composition controlled raw powders; forming the composition controlled raw powders to obtain formed bodies; sintering the formed bodies to obtain sintered bodies and effecting a hot isostatic press treatment for the sintered bodies to obtain ferrite polycrystal bodies.

Here, ferrite crystals with garnet structure are generally shown by $A_3B_5O_{12}$ wherein A is Y, Bi, Ca, Pb and rare earth elements such as La, Ce, Pr, Nd, Pm, Sm, Eu, Gd, Tb, Dy, Ho, Er, Tm, Yb, Lu, and B is basically Fe in which Al, Ga, In, Sn, Zr, Ti, Ge, V, Sb and/or Sc are included.

An another object of the invention is to provide a method of producing ferrite powders with garnet structure preferably used for the ferrite crystal manufacturing method mentioned above.

According to the invention, method of producing ferrite powders comprises the steps of, preparing mixed solutions containing ferrous ions and the other metal ions; coprecipitating hydroxides the with aid of base from the mixed solutions; synthesizing the coprecipitated compounds by oxidizing ferrous ions into ferric ions; and separating, drying and calcining the coprecipitated compounds.

Moreover, according to the invention, a method of producing ferrite powders comprises the steps of, preparing mixed solutions containing ferric nitrate and nitrates of the other metal; dropping the mixed solution into a base solutions to coprecipitate hydroxides; and separating, drying and calcining the coprecipitated compounds.

In the construction mentioned above, ferrite polycrystal bodies having good properties such as porosity of less than 0.01% and light absorption coefficients of less than 50 cm$^{-1}$ at a wavelength of 1.3 micro meter can be obtained by effecting HIP treatment with respect to the sintered polycrystal bodies.

As for the composition controlling method, it is preferred to use a method such that two kinds of garnet ferrite powders having different but near compositions, on powder being higher and the other powder being lower than a target composition, are mixed with each other to obtain garnet ferrite powders having a precise composition.

Moreover, since the thus obtained ferrite polycrystal bodies do not substantially contain any Ca component, the single crystallization by heating the connection body between the mother single crystal and the polycrystal is not affected.

It should be noted that the light absorption coefficient $\alpha$ can be obtained from the following equation;

$$I/I_0 = e^{-\alpha l},$$

wherein $I_0$: intensity of incident light (except for reflection), I: intensity of exit light, l: thickness of polycrystal or single crystal body (mm).

Further, in case that the hot isostatic press treatment is performed under ambient gas including oxygen component preferably more than 0.1%, since a decomposing and melting temperature of garnet becomes higher and thus a sintering temperature can be made higher, residual pores can be reduced and thus a sufficient light transmissivity can be obtained. Moreover, the sufficient transparency of the ferrite polycrystal bodies can be obtained even if the composition controlling is performed in a rough manner.

BRIEF DESCRIPTION OF THE DRAWING

FIGURE 1 is a graph showing particle distributions of ferrite powders with garnet structure.

DESCRIPTION OF THE PREFERRED EMBODIMENTS

Hereinafter, the present invention will be explained in detail.

At first, a method of manufacturing garnet ferrite powders as raw materials will be explained. In the present invention, the powder manufacturing method is not limited and all the known powder manufacturing methods can be applied, if the garnet ferrite powders having a predetermined composition can be obtained. However, it is preferred to use the garnet ferrite powders obtained by the following two coprecipitation methods.

That is to say, the preferred methods include (1) steps of preparing mixed solutions containing a least ferrous ions and yttrium ion or rare earth metal ion, coprecipitating hydroxides with the aid of base from the mixed solution to synthesize coprecipitated compounds by oxidizing ferrous ions into ferric ion, and separating, drying and calcining the coprecipitated compounds, and (2) the steps of preparing mixed solutions containing at least ferric nitrate and nitrate of yttrium or rare earth metal, dropping a base solution into the mixed solution to coprecipitate hydroxides, and separating, drying and calcining the coprecipitated hydroxide are used preferably.

In method (1), since ferric hydroxides are gradually grown in the solutions by blowing gas containing oxygen into the solution in which hydroxides are previously coprecipitated, diameters of ferrite powders with garnet structure obtained by calcining the hydroxides become even. Moreover, since after the coprecipitation mentioned above a heat treatment and a maturing treatment are performed with respect to the ferrite powders to effect melting and precipitating reactions, fine powders can not be obtained at all.

In method (2), since use is made of nitrates which can be decomposed at a temperature of 600° C. as the raw materials and the coprecipitation is performed in the manner such that metal components which need a large pH value for growing the hydroxides are precipitated evenly during a mixing step, sufficient garnet structure can be obtained even by the calcining at low temperatures such as 600° C. Therefore, in method (2), it is possible to produce ferrite powders with garnet structure at low temperatures.

Hereinafter, the methods of producing ferrite powders mentioned above which can be used as the raw materials for the method of manufacturing ferrite crystals with garnet structure will be explained in detail.

At first, in method (1) mentioned above, mixing solutions containing at least ferrous ions and yttrium ions or rare earth metal ion are prepared. In the mixing solutions, it is possible to contain carbonic acid ions not to coprecipitate sulfates.

Then, hydroxides are obtained by mixing the mixing solutions mentioned above and a base such as ammonia. In this case, when use is made of metal ions having substantially the same pH values as that of the hydroxides to be obtained, a base such as ammonia is only added to the mixing solutions. Contrary to this, when use is made of metal ions having larger pH values as that of the hydroxides, it is preferred that the mixing solutions are gradually dropped into solutions having constant pH values to generate hydroxides at the same time. Further, as for the base materials for use in the coprecipitation, use may be made of ammonia, tetramethyl ammonium hydroxide, tetra-ethyl ammonium hydroxide, tri ethyl phenyl ammonium hydroxide, and the like, in which no metal ions are contained. This is because metal ions remain therein and generate solution phases during sintering steps which affect a generation of good ferrite crystals.

Then, a gas containing oxygen component is blown into the solutions after coprecipitation is ended. In this case, oxidizing rates are different corresponding to a density of oxygen to be used and a size of bubbles generating therein, and the oxidizing rate is fastest when use is made of the gas of 100% oxygen and fine bubbles. Moreover, temperatures of the solution during oxidizing reactions may be more than 40° C. when taking into account of reaction speeds an reaction times. Further, the gas blowing operation mentioned above is finished by 1-2 hours.

After the oxidizing reaction mentioned above, heating of the solution and an oxygen blowing are performed for more than 30 minutes to perfectly coprecipitate the non-reacted ferrous ion into ferric ion and to obtain mixed hydroxide powders having even particle diameters by the melting and precipitating reaction of the fine particles.

Further, in method (2) mentioned above, mixing solutions are prepared by mixing ferric nitrate solutions and metal solutions containing yttrium nitrate and rare earth metal nitrate at a predetermined mixing ratio on mol %.

Then, hydroxides are obtained by mixing the mixing solutions mentioned above and a base such as ammonia. In this case, since ferric ions in the mixing solutions have a pH value largely different from that of yttrium or rare earth metal ions, it is necessary to gradually drop the mixing solutions into the base solutions to generate the hydroxides at the same time. For example, pH values of generating hydroxides are Bi: more than pH1, $Fe^{3+}$: more than pH2, Y: more than pH7. Further, as for the base materials for use in the coprecipitation, use may be made of ammonia, tetramethyl ammonium hydroxide, tetra-ethyl ammonium hydroxide, tri-ethyl phenyl ammonium hydroxide etc., in which no metal ions are contained. This is because metal ions remain therein and generate solution phases during sintering steps which affect a generation of good ferrite crystals.

Then, both in method (1) and the method (2), the thus obtained coprecipitated hydroxides are separated and washed repeatedly till little anion of sulfate, nitrate, ammonium etc. is detected therein.

Then, the separated and washed coprecipitated hydroxides are dried up.

The dried up powders obtained according to method (1) are calcined at temperatures of 600°-1300° C. Preferable calcining temperatures are largely different corresponding to the compositions of garnet to be obtained. Especially, in Bi garnets having low melting temperatures, it is necessary to be calcined at low temperatures. The reasons for limiting the calcined temperatures as 600°-1300° C. are such that, if the calcined temperatures are less than 600° C., garnet reactions do not occur at all, and, if the calcined temperatures are more than 1300° C., the powders are sintered and thus powders having good formability are not obtained.

For one example, YIG powders obtained according to method (1) start its garnetizations from temperatures about 900° C. and more than 90% of powders become garnet structure at 1000° C. Therefore, as compared with the powder mixing method, it is possible to generate garnet structure at temperatures by 200°-300° C. lower than that of the powder mixing method.

The dried up powders obtained according to method (2) are calcined at temperatures of 600°-1100° C. Preferable calcining temperatures are largely different corresponding to the compositions of garnet to be obtained, especially, substituted amount of Bi. The reasons for limiting the calcined temperatures as 600°-1100° C. are such that, if the calcined temperatures are less than 600° C., garnet reactions do not occur at all, and, if the calcined temperatures are more than 1100° C., the powders are sintered and thus powders having good formability are not obtained.

For one example, $Bi_1Y_2Fe_5O_{12}$ powders obtained according to the method (1) start its garnetizations from temperatures about 700° C. and 100% of powders become garnet structure at 800° C. Therefore, it is possible to generate garnet structure at temperatures by 400°-500° C. lower than that of the powder mixing method.

Then, the calcined bodies are crushed, and particle diameters after crushing operation are 0.5-2.5 micro meter both in the method (1) and in method (2), which are within a very narrow particle size distribution.

Then, a composition of the thus obtained garnet ferrite powders is controlled preferably in such a manner that errors of respective compositions are existent within 0.10 mol % more preferably within 0.05 mol % with respect to the target compositions. In this case, the composition controlling is performed preferably in the following manner.

Hereinafter, the composition controlling will be explained in the case that the target composition of $Y_3Fe_5O_{12}$ crystal is Y: 37.5 mol % and Fe: 62.5 mol %. In this case, a garnet ferrite powder A (Y: 38 mol %, Fe: 62 mol %) and a garnet ferrite powder B (Y: 37 mol %, Fe: 63 mol %) are prepared and are mixed by varying a mixing ratio of powders A and B to obtain garnet ferrite powders having composition errors within 0.1 mol % preferably 0.05 mol % with respect to the target compositions. In this case, it is preferred that a difference in mol % between the powder A and the powder B is made smaller. When the difference on mol % is large, properties of the powder A and the powder B are largely different and thus forming property and sintering property become bad. When use is made of the other composition controlling method it is difficult to obtain garnet ferrite powders having a precise composition, since a composition is varied during the manufacturing steps due to an inclusion of Fe component during crushing or volatilizing Bi component during calcining if a part of Fe is substituted by Bi.

Then, garnet ferrite powders after the composition controlling are formed to obtain formed bodies having a predetermined shape, and the formed bodies are once sintered. Then, a normal HIP under a normal condition (an inert atmosphere such as Ar or $N_2$) or an oxygen HIP under an atmosphere including oxygen component (mixture of oxygen and Ar gas) is performed with respect to the sintered bodies to obtain ferrite polycrystal bodies having a garnet structure according to the invention.

After that, in order to obtain ferrite single crystal bodies from the thus obtained ferrite polycrystal bodies, it is preferred to use a method of manufacturing a single crystal with garnet structure, for example, disclosed by the applicant in Japanese Patent Laid-Open Publication No. 63-35496.

Hereinafter, actual embodiments will be explained.

EXAMPLE 1

Two kinds of powders A (Bi:Fe:Y=12.0:62.5:25.0 calculated by mol %) and B (Bi:Fe:Y=13.0:62.5:25.0 calculated by mol %) were prepared from raw materials including bismuth nitrate, ferric nitrate and yttrium nitrate by using a coprecipitation method. Then, by varying mixing ratios between powders A and B as mentioned below, the composition controlling was performed as the target composition of $BiY_2Fe_5O_{12}$ (Bi: 12.5 mol %, Fe: 62.5 mol %, Y: 25.0 mol %).

That is to say, after powders A and B were dried, calcined at 800° C. and crushed, two kinds of powders A and B were mixed in wet conditions at mixing ratios shown in Table 1 and then dried up to obtain mixed powders. Then, the mixed powders were formed and sintered at 950° C. for 10 hours. After that, sintered bodies were machined into blocks having a dimension of $10 \times 10 \times 7$ mm, and a normal HIP was performed with respect to the blocks under the condition of 950° C., for 4 hours to obtain specimens. The specimens were further machined into specimens having a dimension of $7 \times 10 \times 1$ mm or $7 \times 10 \times 0.3$ mm, and both machined surfaces were polished. After that, a light transmissivity at 1.3 micro meter and Faraday rotation angle were measured with respect to the specimens.

Moreover, as for a comparative example 1, specimens were prepared in the same manner mentioned above except that the composition controlling using two kinds of powders was not performed. As for a comparative example 2, specimens were prepared in the manner disclosed in Japanese Patent Laid-Open Publication No. 63-163815 in which Ca and V were added (composition: $Bi_1Ca_1Y_1Fe_{4.5}V_{0.5}O_{12}$) except that the composition controlling mentioned above and a normal HIP were not performed. As for a comparative example 3, specimens were prepared in the same manner mentioned above in which the composition controlling was performed to obtain powders having composition errors within 0.05 mol % except that a normal HIP was not performed. Then, a light transmissivity and Faraday rotation angle were measured in the same manner mentioned above with respect to the specimens according to the comparative examples 1-3. The results of measurements are shown in Table 1.

In this case, a light transmissivity was measured with the aid of a light power meter using LED having a wavelength of 1.3 micro meter, and Faraday rotation angle was measured in such a manner that an analyzer was rotated to the specimen, to which saturated magnetic fields were applied, until a light beam does not pass through, and the rotation angle was detected as Faraday rotation angle. In Table 1, the mark shows that various measurements were not possible since the light transmissibity was too low.

TABLE 1

| Specimen No. | Mixing ratio A | Mixing ratio B | Composition controlling Fe (mol %) | HIP treatment | Light absorption coefficient ($cm^{-1}$) | Faraday rotation angle (deg/cm) | Remarks |
| --- | --- | --- | --- | --- | --- | --- | --- |
| 1 | 15 | 5 | 62.65 | effected | — | — | |
| 2 | 14 | 6 | 62.62 | effected | — | — | |
| 3 | 13 | 7 | 62.59 | effected | — | — | |
| 4 | 12 | 8 | 62.56 | effected | — | — | |
| 5 | 11 | 9 | 62.53 | effected | 100 | 2200 | |
| 6 | 10 | 10 | 62.50 | effected | 60 | 2200 | |
| 7 | 9 | 11 | 62.47 | effected | 10 | 2200 | Present invention |
| 8 | 8 | 12 | 62.44 | effected | 2 | 2200 | Present invention |
| 9 | 7 | 13 | 62.41 | effected | 25 | 2200 | Present invention |
| 10 | 6 | 14 | 62.38 | effected | 80 | 2200 | |
| 11 | 5 | 15 | 62.35 | effected | 150 | 2200 | |
| Comparative 1 | — | — | 62.50 | effected | 65 | 2200 | Comparative example |
| Comparative 2 | — | — | 62.50 | not effected | 15 | 1500 | Comparative example |
| Comparative 3 | 8 | 12 | 62.44 | not effected | — | — | Comparative example |

From the results shown in Table 1, among the specimen Nos. 1-11 in which the composition controlling using two kinds of powders and the normal HIP were performed, the specimen Nos. 7-9 in which composition controlling errors were within 0.05 mol % with respect to the target composition show a good light transmissivity. Contrary to this, the specimen Nos. 6 and 10 in which composition controlling errors were not within 0.05 mol % do not show a good light transmissivity.

Moreover, the comparative specimens Nos. 1-3 in which the composition controlling according to the invention and/or the normal HIP were not performed show a bad light transmissivity and a bad Faraday rotation angle as compared with the specimen Nos. 7-9 according to the invention.

Further, with respect to the specimen No. 8 in which mixing ratio between powders A and B was A:B=8:12 the other magnetooptical properties such as saturation magnetization and Verdet constant were measured, and the results were obtained as saturation magnetization of 2100 G and Verdet constant of 1.3 deg/cm.Oe.

EXAMPLE 2

Two kinds of powders A (Fe:Y:Tb=62.0:30.4:7.6 calculated by mol %) and B (Fe:Y:Tb=63.0:29.6:7.4 calculated by mol %) were prepared from raw materials including ferrous sulfate, yttrium nitrate and terbium nitrate by using coprecipitation method. Then, by varying mixing ratios between powders A and B as mentioned below, the composition controlling was performed as the target composition of $Y_{2.4}Tb_{0.6}Fe_5O_{12}$ (Fe: 62.5 mol %, Y: 30.0 mol %, Tb: 7.5 mol %).

That is to say after powders A and B were dried, calcined at 1200° C. and crushed, two kinds of powders A and B were mixed in wet conditions at mixing ratios shown in Table 2 and then dried to obtain mixed powders. Then, the mixed powders were formed and sintered at 1400° C. for 8 hours. After that, sintered bodies were machined into blocks having a dimension of $10 \times 10 \times 7$ mm, and a normal HIP was performed with respect to the blocks under the condition of 1500° C. for 4 hours to obtain specimens. The specimens were further machined into specimens having a dimension of $7 \times 10 \times 1$ mm or $7 \times 10 \times 0.3$ mm, and both machined surfaces were polished. After that, a light transmissivity at 1.3 micro meter and Faraday rotation angle were measured with respect to the specimens.

Moreover, as for a comparative example 4, specimens were prepared in the same manner mentioned above except that the composition controlling using two kinds of powders was not performed. As for a comparative example 5, specimens were prepared in the manner disclosed in Japanese Patent Laid-Open Publication No. 63-163815 in which Ca and V were added (composition: $Y_2Tb_5Ca_{0.5}Fe_{4.75}V_{0.25}O_{12}$) except that the composition controlling mentioned above and a normal HIP were not performed. As for a comparative example 6, specimens were prepared in the same manner mentioned above in which the composition controlling was performed to obtain powders having composition errors within 0.05 mol % except that a normal HIP was not performed. Then, a light transmissivity and Faraday rotation angle were measured in the same manner as those of the example 1. The results of measurements are shown in Table 2.

within 0.05 mol % do not show a good light transmissivity.

Moreover, the comparative specimens Nos. 4-6 in which the composition controlling according to the invention and/or the normal HIP were not performed show a bad light transmissivity and a bad Faraday rotation angle as compared with the specimen Nos. 3-5 according to the invention.

Further, with respect to the specimen No. 4 in which mixing ratio between powders A and B was A:B=12:8, the other magnetooptical properties such a saturation magnetization and Verdet constant were measured, and the results were obtained as saturation magnetization of 1800 G and Verdet constant of 0.18 deg/cm.Oe.

EXAMPLE 3

Garnet powders having compositions shown in Table 1 as specimens Nos. 1–10 were prepared from raw materials including nitrate solution and sulfate solution by using coprecipitation method or from raw materials including oxide powders by using powder mixing method. Then, the prepared garnet powders were calcined, crushed and formed as is the same manner as that of Example 1, and the formed bodies were sintered at temperatures shown in Table 3 for 10 hours. After that, the sintered bodies were machined into specimen blocks, and an oxygen HIP was performed with respect to the specimen blocks under ambient gas including Ar gas and oxygen gas having volume percentage of 0.1%, 1%, 5% or 20%.

Then, with respect to the specimen blocks, a light

TABLE 2

| Specimen No. | Mixing ratio A | Mixing ratio B | Composition controlling Fe (mol %) | HIP treatment | Light absorption coefficient (cm$^{-1}$) | Faraday rotation angle (deg/cm) | Remarks |
| --- | --- | --- | --- | --- | --- | --- | --- |
| 1 | 15 | 5 | 62.25 | effected | 90 | 240 | |
| 2 | 14 | 6 | 62.30 | effected | 60 | 240 | — |
| 3 | 13 | 7 | 62.35 | effected | 10 | 240 | Present invention |
| 4 | 12 | 8 | 62.40 | effected | 1 | 240 | Present invention |
| 5 | 11 | 9 | 62.45 | effected | 15 | 240 | Present invention |
| 6 | 10 | 10 | 62.50 | effected | 70 | 240 | — |
| 7 | 9 | 11 | 62.55 | effected | 100 | 240 | — |
| 8 | 8 | 12 | 62.60 | effected | — | — | — |
| 9 | 7 | 13 | 62.65 | effected | — | — | — |
| 10 | 6 | 14 | 62.70 | effected | — | — | — |
| 11 | 5 | 15 | 62.75 | effected | — | — | — |
| Comparative 4 | — | — | 62.50 | effected | 70 | 240 | Comparative example |
| Comparative 5 | — | — | 62.50 | not effected | 20 | 180 | Comparative example |
| Comparative 6 | 12 | 8 | 62.40 | not effected | — | — | Comparative example |

From the results shown in Table 2, among the specimen Nos. 1–11 in which the composition controlling using two kinds of powders and the normal HIP were performed, the specimen Nos. 3–5 in which composition controlling errors were within 0.05 mol % with respect to the target composition show a good light transmissivity. Contrary to this, the specimen Nos. 2 and 6 in which composition controlling errors were not transmissivity and Faraday rotation angle were measured in the same manner as those of Example 1. In Table 3, since Faraday rotation angle was not varied corresponding to a variation of ambient gases, typical Faraday rotation angle was shown. Moreover, in the specimen Nos. 9 and 10 in which Ca was added, the specimens to which no HIP treatment was performed were also tested as prior arts. The results of measurements are shown in Table 3.

TABLE 3

| Specimen No. | Composition | Manufacturing method | Sintering temperature (°C.) | HIP treatment temperature (°C.) | Faraday rotation angle (deg/cm) | Light absorption coefficient (cm$^{-1}$) | | | | | No HIP treatment |
|---|---|---|---|---|---|---|---|---|---|---|---|
| | | | | | | Ar gas | 0.1 | 1 | 5 | 20 | |
| | | | | | | Oxygen in HIP ambient gas (%) | | | | | |
| 1 | $Bi_{1.0}Y_{2.0}Fe_{5.0}O_{12}$ | Coprecipitation | 950 | 950 | 2200 | 65 | 40 | 20 | 10 | 3 | — |
| 2 | | Powder | 1050 | 1000 | 2200 | — | — | — | 70 | 40 | — |
| 3 | $Y_{2.4}Tb_{0.6}Fe_{5.0}O_{12}$ | Coprecipitation | 1400 | 1500 | 240 | 70 | 45 | 30 | 15 | 5 | — |
| 4 | | Powder | 1400 | 1500 | 240 | — | — | — | 90 | 45 | — |
| 5 | $Bi_{1.0}Y_{2.0}Fe_{4.0}-$ | Coprecipitation | 950 | 950 | 1700 | 30 | 20 | 10 | 5 | 2 | — |
| 6 | $Ga_{1.0}O_{12}$ | Powder | 1050 | 1000 | 1700 | — | — | — | 60 | 20 | — |
| 7 | $Bi_{1.0}Gd_{0.62}Y_{1.39}-$ | Coprecipitation | 950 | 950 | 2200 | 60 | 35 | 20 | 10 | 3 | — |
| 8 | $Fe_{5.0}O_{12}$ | Powder | 1050 | 1000 | 2200 | — | — | — | 70 | 30 | — |
| 9 | $Y_{2.0}Tb_{0.5}Ca_{0.5}-$<br>$Fe_{4.75}V_{0.25}O_{12}$ | Powder | 1400 | 1500 | 180 | 15 | 12 | 10 | 8 | 5 | 20 |
| 10 | $Bi_{1.0}Ca_{1.0}Y_{1.0}-$<br>$Fe_{4.5}V_{0.5}O_{12}$ | Powder | 1000 | 1000 | 1500 | 10 | 8 | 7 | 5 | 3 | 15 |

From the results shown in Table 3, the oxygen HIP treatment was very effective for all the specimens. Moreover, even for the specimen Nos. 9 and 10 including Ca component, the oxygen HIP treatment was effective.

EXAMPLE 4

As shown in Table 4, the composition controlling was performed by using two kinds of synthesized powders A and B in the same manner as that of Example 1. After that, the specimens shown as Nos. 1-6 in Table 4 were obtained in accordance with the same manufacturing steps as those of Example 1 except that the oxygen HIP was performed under ambient gases including 0.1%, 1%, 5% and 20% of oxygen. With respect to the thus obtained specimens, a light transmissivity and Faraday rotation angle were measured in the same manner as those of Example 1, and the measured data were shown in Table 4 as well as the composition controlling errors.

ferrite polycrystal bodies with garnet structure having good magnetooptical properties such a light transmissivity, Faraday rotation angle and Verdet constant can be obtained.

Then, a method of manufacturing ferrite single crystal bodies according to the invention from the thus obtained ferrite polycrystal bodies will be explained.

EXAMPLE 5

Two kinds of powders A (Fe:Y=62.0:38.0 calculated by mol %) and B (Fe:Y=63.0:37.0 calculated by mol %) were prepared from raw materials including ferrous sulfate and yttrium nitrate by using coprecipitation method. Then, by varying mixing ratios between powders A and B as mentioned below, the composition controlling was performed as the target composition of $Y_3Fe_5O_{12}$.

That is to say, after powders A and B were dried, calcined at 1200° C. and crushed, two kinds of powders A and B were mixed in wet conditions at mixing ratios

TABLE 4

| Specimen No. | Mixing ratio | | Composition controlling Fe (mol %) | Composition controlling errors (mol %) | Faraday rotation angle (deg/cm) | Light absorption coefficient (cm$^{-1}$) | | | |
|---|---|---|---|---|---|---|---|---|---|
| | A | B | | | | Oxygen in HIP ambient gas (%) | | | |
| | | | | | | 0.1 | 1 | 5 | 20 |
| 1 | 15 | 5 | 62.65 | +0.21 | 2200 | — | — | — | 60 |
| 2 | 14 | 6 | 62.62 | +0.18 | 2200 | — | 90 | 55 | 40 |
| 3 | 13 | 7 | 62.59 | +0.15 | 2200 | — | 60 | 25 | 15 |
| 4 | 12 | 8 | 62.56 | +0.12 | 2200 | 100 | 40 | 18 | 8 |
| 5 | 11 | 9 | 62.53 | +0.09 | 2200 | 40 | 25 | 10 | 5 |
| 6 | 10 | 10 | 62.50 | +0.06 | 2200 | 22 | 12 | 8 | 3 |
| 7 | 9 | 11 | 62.47 | +0.3 | 2200 | 7 | 5 | 4 | 2 |
| 8 | 8 | 12 | 62.44 | 0 | 2200 | 1.3 | 0.8 | 0.5 | 0.3 |
| 9 | 7 | 13 | 62.41 | −0.03 | 2200 | 9 | 7 | 5 | 3 |
| 10 | 6 | 14 | 62.38 | −0.06 | 2200 | 24 | 13 | 10 | 5 |
| 11 | 5 | 15 | 62.35 | −0.09 | 2200 | 45 | 35 | 20 | 10 |
| 12 | 4 | 16 | 62.32 | −0.12 | 2200 | 110 | 50 | 35 | 20 |
| 13 | 3 | 17 | 62.29 | −0.15 | 2200 | — | 100 | 50 | 38 |
| 14 | 2 | 18 | 62.26 | −0.18 | 2200 | — | — | 80 | 50 |
| 15 | 1 | 19 | 62.23 | −0.21 | 2200 | — | — | — | 90 |
| 16 | 0 | 20 | 62.20 | −0.24 | 2200 | — | — | — | — |

From the results shown in Table 4, in the specimen No. 1-16 in which both of the oxygen HIP treatment and the composition controlling were performed, the specimen Nos. 5-11 having composition controlling errors within 0.10 mol %, which is broader than that of Example 1 or 2, show a good light transmissivity. Further, in the specimens shown by specimen Nos. 1-4 and 12-16, an effect of the oxygen HIP was increased correspondingly to an increase of oxygen density.

In the embodiments shown by Examples 1-4 mentioned above, since the composition controlling and the normal or oxygen HIP treatment were performed, the shown in Table 5 and then dried to obtain mixed powders. Then, the mixed powders were formed and sintered at 1400° C. for 8 hours. After that, sintered bodies were machined into blocks having a dimension of 5×10×10 mm, and mother single crystal bodies obtained from $Y_3Fe_5O_{12}$ single crystal were connected to the blocks to obtain connected blocks. Then, with respect to the connected blocks, heat-treatment at 1500° C. under oxygen atmosphere in a normal pressure, normal HIP treatment under Ar atmosphere in 1500 atm, and oxygen HIP treatment under 20% oxygen atmosphere in 1500 atm were performed to grow ferrite single crystal the ferrite polycrystal body.

After that, a growing distance of the ferrite single crystal from a connection boundary was measured, and or not second phases were generated was detected. The results of measurements are shown in Table 5 as well as the composition controlling errors with respect to the target composition.

calculated by mol %) were prepared from raw materials including bismuth nitrate, ferric nitrate and yttrium nitrate by using coprecipitation method. Then, by varying mixing ratios between powders A and B as mentioned below, the composition controlling was performed as the target composition of $BiY_2Fe_5O_{12}$ (Bi:12.5 mol %, Fe: 62.5 mol %, Y: 25.0 mol %).

That is to say, after powders A and B were dried, calcined at 800° C. and crushed, two kinds of powders

TABLE 5

| Specimen No. | Mixing ratio A | Mixing ratio B | Composition controlling Fe (mol %) | Normal pressure Growing distance (mm) | Normal pressure Second phase | Normal pressure Composition controlling errors (mol %) | Ar HIP Growing distance (mm) | Ar HIP Second phase | Ar HIP Composition controlling errors (mol %) | O$_2$ HIP Growing distance (mm) | O$_2$ HIP Second phase | O$_2$ HIP Composition controlling errors (mol %) |
|---|---|---|---|---|---|---|---|---|---|---|---|---|
| 1 | 15 | 5 | 62.25 | x | not existent | | x | not existent | | x | not existent | |
| 2 | 14 | 6 | 62.30 | x | not existent | | x | not existent | −0.125 | x | not existent | — |
| 3 | 13 | 7 | 62.35 | x | not existent | −0.125 | 5 | not existent | −0.075 | x | not existent | |
| 4 | 12 | 8 | 62.40 | 5 | not existent | −0.075 | 5 | not existent | −0.025 | x | not existent | −0.15 |
| 5 | 11 | 9 | 62.45 | 5 | not existent | −0.025 | 5 | not existent | +0.025 | 5 | not existent | −0.10 |
| 6 | 10 | 10 | 62.50 | 5 | not existent | +0.025 | 5 | not existent | +0.075 | 5 | not existent | −0.05 |
| 7 | 9 | 11 | 62.55 | 5 | not existent | +0.075 | 4 | existent | +0.125 | 5 | not existent | 0 |
| 8 | 8 | 12 | 62.60 | 4 | existent | +0.125 | 4 | existent | | 5 | not existent | +0.05 |
| 9 | 7 | 13 | 62.65 | 4 | existent | | 3 | existent | | 4 | not existent | +0.10 |
| 10 | 6 | 14 | 62.70 | 2 | existent | | 2 | existent | | 3 | existent | +0.15 |
| 11 | 5 | 15 | 62.75 | 2 | existent | | 2 | existent | | 2 | existent | |

From the results shown in Table 5, in the growth of the single crystal by utilizing a solid-phase reaction, if the composition controlling is performed preferably to the level such that the composition controlling errors were within 0.1 mol %, it is possible to grow single crystals stably and to obtain the single crystal having a long growing distance and no second phases under almost all the atmosphere. Moreover, if the ferrite components were in excess states, the second phase consisting essentially of ferric oxide was generated, and if the ferrite componets were in less states, the single crystal was not grown at all. Further, the single crystal manufactured by the HIP treatment shows a good crystallization having a density above 99.99% and random patterns of magnetic domains. The single crystal thus obtained has such properties that Faraday rotation angle at a wavelength of 1.3 micro meter was 200 deg/cm and light absorption coefficient was 1.2 cm$^{-1}$ in an Ar atmosphere and 0.5 cm$^{-1}$ in an O$_2$ atmosphere.

EXAMPLE 6

Two kinds of powders A (Bi:Fe:Y=12.0:62.5:25.0 calculated by mol %) and B (Bi:Fe:Y=13.0:62.5:25.0

A and B were mixed in wet conditions at mixing ratios shown in Table 6 and then dried to obtain mixed powders. Then, the mixed powders were formed and sintered at 950° C. for 10 hours. After that, sintered bodies were machined into blocks having a dimension of 5×10×10 mm, and mother single crystal bodies obtained from $Bi_1Y_2Fe_5O_{12}$ single crystal were connected to the locks to obtain connected blocks. Then, with respect to the connected blocks, heat-treatment at 1000° C. under oxygen atmosphere in a normal pressure, normal HIP treatment under Ar atmosphere in 1500 atm, and oxygen HIP treatment under 20% oxygen atmosphere in 1500 atm were performed to grow ferrite single crystal the ferrite polycrystal body.

After that, a growing distance of the ferrite single crystal from a connection boundary was measured, and whether or not second phases were generated or not was detected. The results of measurements are shown in Table 6 as well as the composition controlling errors with respect to the target composition.

TABLE 6

| Specimen No. | Mixing ratio A | Mixing ratio B | Composition controlling Fe (mol %) | Normal pressure Growing distance (mm) | Normal pressure Second phase | Normal pressure Composition controlling errors (mol %) | Ar HIP Growing distance (mm) | Ar HIP Second phase | Ar HIP Composition controlling errors (mol %) | O$_2$ HIP Growing distance (mm) | O$_2$ HIP Second phase | O$_2$ HIP Composition controlling errors (mol %) |
|---|---|---|---|---|---|---|---|---|---|---|---|---|
| 1 | 15 | 5 | 62.65 | — | existent | | — | existent | | — | existent | |
| 2 | 14 | 6 | 62.62 | — | existent | | — | existent | | — | existent | |
| 3 | 13 | 7 | 62.59 | — | existent | | — | existent | | — | existent | |
| 4 | 12 | 8 | 62.56 | 1 | existent | +0.12 | — | existent | | 2 | existent | +0.12 |
| 5 | 11 | 9 | 62.53 | 2 | existent | +0.09 | 1 | existent | +0.15 | 3 | not existent | +0.09 |
| 6 | 10 | 10 | 62.50 | 3 | not | +0.06 | 2 | existent | +0.12 | 5 | not | +0.06 |

TABLE 6-continued

| Specimen No. | Mixing ratio A | Mixing ratio B | Composition controlling Fe (mol %) | Normal pressure Growing distance (mm) | Normal pressure Second phase | Normal pressure Composition controlling errors (mol %) | Ar HIP Growing distance (mm) | Ar HIP Second phase | Ar HIP Composition controlling errors (mol %) | O₂ HIP Growing distance (mm) | O₂ HIP Second phase | O₂ HIP Composition controlling errors (mol %) |
| --- | --- | --- | --- | --- | --- | --- | --- | --- | --- | --- | --- | --- |
| 7 | 9 | 11 | 62.47 | 5 | existent not existent | +0.03 | 3 | existent | +0.09 | 5 | existent not existent | +0.03 |
| 8 | 8 | 12 | 62.44 | 5 | not existent | 0 | 5 | not existent | +0.06 | 5 | not existent | 0 |
| 9 | 7 | 13 | 62.41 | 5 | not existent | −0.03 | 5 | not existent | +0.03 | 5 | not existent | −0.03 |
| 10 | 6 | 14 | 62.38 | 5 | not existent | −0.06 | 5 | not existent | 0 | 5 | not existent | −0.06 |
| 11 | 5 | 15 | 62.35 | 4 | existent | −0.09 | 5 | not existent | −0.03 | 4 | not existent | −0.09 |
| 12 | 4 | 16 | 62.32 | 4 | existent | −0.12 | 3 | not existent | −0.06 | 3 | not existent | −0.12 |
| 13 | 3 | 17 | 62.29 | 2 | existent | −0.15 | 3 | existent | −0.09 | 2 | existent | −0.15 |
| 14 | 2 | 18 | 62.26 | — | existent |  | 2 | existent | −0.12 | 2 | existent | −0.18 |
| 15 | 1 | 19 | 62.23 | — | existent |  | — | existent |  | — | existent |  |
| 16 | 0 | 20 | 62.20 | — | existent |  | — | existent |  | — | existent |  |

From the results shown in Table 6, in the method of manufacturing ferrite single bodies with garnet structure according to the invention in which a composition is different from that of Example 5, it is possible to grow a single crystal stably as is the same manner as that of Example 5. Moreover, if the ferrite components were in excess states, the second phase consisting essentially of ferric oxides was generated, and if the ferrite components were in less states, the second phase consisting essentially of bismuth oxides was generated. Further, the single crystal manufactured by the HIP treatment shows a good crystallization having a density above 99.99% and random patterns of magnetic domains. The single crystal thus obtained has such properties that Faraday rotation angle was 2200 deg/cm and light absorption coefficient was 1.3 cm$^{-1}$ in an Ar atmosphere and 0.6 cm$^{-1}$ in an O₂ atmosphere.

In the embodiments shown by Examples 5-6 mentioned above, since use is made of the ferrite polycrystal to which the composition controlling and the normal or oxygen HIP treatment were performed to grow the single crystal, it is possible to grow the ferrite single crystal stably and to obtain the ferrite single crystal having no second phases.

Hereinafter, actual embodiments of the method of producing ferrite powders according to the invention will be explained in detail. At first, the ferrite powder producing method (1) will be explained.

EXAMPLE 7

About 10 liters of solutions containing about 600 g of $Y_3Fe_5O_{12}$ were prepared by mixing ferrous sulfate solution and yttrium nitrate solution, and the mixed solutions were dropped into solutions of about 20 liters, a pH value of which is controlled at 8 by using ammonia solution and a temperature of which is controlled at 75° C. The dropping operation was performed with agitations and finished for about 30 minutes. During the dropping operation, ammonia solution was further dropped therein so as to maintain pH value of the solution at 8. Then, an oxygen gas was blown into the generated green slurry as fine bubbles at a rate of 10 l/min. Reactions were finished for about 2 hours and the green slurry became a brown slurry. In the present invention, in order to make further the powder particles even, the heating operation and the oxygen blowing operation mentioned above were continued for about 3 hours.

Also in this step, since pH values were decreased due to oxidizing reactions, ammonia solution was further dropped therein so as to maintain pH value of the solution at 8.

Then, the generated slurry was separated and washed until no sulfuric acid ions and hydrochloric acid ions were contained in the washing solutions. The thus washed slurry was dried up to obtain fine powders.

The dried up fine powders were calcined at 1100° C. for 4 hours, and the calcined bodies were crushed by the attrition mill. Then, an crushed powders were formed by a press machine and the formed bodies were sintered at 1400° C. for 4 hours to obtain the sintered bodies having a dimension of a thickness of 7 mm, a width of 20 mm and a length of 30 mm.

Then, the sintered bodies were further machined into a shape of a thickness of 5 mm, a width of 10 mm and a length of 10 mm, and were connected to a mother single crystal obtained from $Y_3Fe_5O_{12}$ single crystals, to which a heat treatment at 1520° C. was effected.

As a result, the mother single crystal was grown by a distance more than 5 mm, and it is confirmed that the single crystals can be grown by the solid-phase reactions.

EXAMPLE 8

About 10 liters of solutions containing about 600 g of $Tb_{0.6}Y_{2.4}Fe_5O_{12}$ were prepared by mixing ferrous sulfate solution and yttrium nitrate solution, and the ferrite powders with garnet structure were produced from the mixed solutions in the same manner as that of Example 7.

Then, a mother single crystal obtained from $Tb_{0.6}Y_{2.4}Fe_5O_{12}$ single crystal was connected to the sintered bodies obtained from the ferrite powders in the same manner as that of Example 7, and a heat treatment was performed at 1500° C. to the connection bodies. As a result, it was confirmed that the mother single crystal was grown by the distance more than 5 mm.

EXAMPLE 9

About 10 liters of solutions containing about 600 g of $Bi_{0.5}Y_{2.5}Fe_5O_{12}$ were prepared by mixing ferrous Sulfate solution and yttrium nitrate solution, and the mixed solutions were dropped into solutions of about 20 liters into which 200 g of ammonium carbonate were added to control a pH value at 8, a temperature of which was controlled at 75° C. The dropping operation was performed with agitations and finished for about 30 minutes. After that the ferrite powders with garnet structure were produced in the same manner as that of Example 7 except that the calcined temperature was 900° C and the sintering temperature was 1100° C.

Then, a mother single crystal obtained from $Bi_{0.5}Y_{2.5}Fe_5O_{12}$ single crystal was connected to the sintered bodies obtained from the ferrite powders mentioned above. As a result, it was confirmed that the mother single crystal was grown by the distance more than 5 mm, as is the same as the Example 7 and the Example 8.

COMPARATIVE EXAMPLE 1

324.6 g of ferric oxide powders and 275.4 g of yttrium oxide powders were added into 600 g of water, and were mixed in wet state for 2 hours by using a ball mill. Then, the thus obtained mixed slurry was dried up, and was calcined at 1200° C. for 4 hours. The calcined bodies were crushed by an attrition mill, and were formed by a press machine. The formed bodies were sintered at 1400° C. for 4 hours, and the sintered bodies were machined into the sintered bodies having a dimension of a thickness of 7 mm, a width of 20 mm and a length of 30 mm.

The sintered bodies were further machined into a shape of a thickness of 5 mm, a width of 10 mm and a length of 30 mm and the same single crystal growing test as that of the Example 7 was performed. As a result, it was confirmed that the mother single crystal was grown by a distance only 0.5-2 mm and a large number of pores were existent in the growing single crystal.

COMPARATIVE EXAMPLE 2

About 10 liters of solutions containing about 600 g of $Y_3Fe_5O_{12}$ were prepared by mixing ferric sulfate solution and yttrium nitrate solution, and the ferrite powders were produced in the same manner as that of Example 7, except that oxidizing operation was not performed. The produced ferrite powders were tested in the same manner. As a result, it was confirmed that the mother single crystal was grown by a distance only 0.5-2 mm and a large number of pores were existent in the growing single crystal.

In Table 7, average particle size and sintering density according to the Examples 7-9 and the comparative examples 1-2 are shown, and results of particle distributions are shown in FIG. 1.

TABLE 7

| | Average particle size(μm) | Sintering density |
|---|---|---|
| Example 7 | 1.3~1.4 | 99.9% |
| Example 8 | 1.3~1.4 | 99.9% |
| Example 9 | 1.1~1.2 | 99.8% |
| Comparative Example 1 | 2.0~2.1 | 99.0% |
| Comparative Example 2 | 1.3~1.4 | 99.5% |

Then, the ferrite powder producing method (2) will be explained.

EXAMPLE 10

5 liters of solutions containing about 600 g of $Y_2BiFe_5O_{12}$ were prepared by mixing bismuth nitrate solution, ferric nitrate solution and yttrium nitrate solution. Then, the prepared mixed solutions were dropped into ammonia solutions of about 1 liters maintained at 70° C. The dropping operation was performed with vibrations for effecting reactions evenly and finished for about 1 hour. After that, the coprecipitated slurry was heated and agitated for about 2 hours to mature the coprecipitated compounds.

Then, the generated slurry was separated and washed, and after that the washed slurry was dried up and calcined at 800° C. As a result, yttrium ferrite garnet powders, a part of which was substituted by bismuth, having garnetization rate of 100% were obtained. Then, the thus obtained powders were formed and sintered at 950° C. for 10 hours. Consequently, garnet sintered bodies with a single phase having a density of 99.9% were obtained.

Then, the thus obtained sintered bodies were machined into a shape having a thickness of 5 mm, a width of 10 mm and a length of 10 mm, and a mother single crystal was connected to the sintered bodies to which a heat treatment at 1000° C. was performed. As a result, the mother single crystal was grown by a distance more than 5 mm, and it was confirmed that the growth of single crystal was possible by the solid-phase reaction.

EXAMPLE 11

5 liters of solutions containing about 600 g of $Bi_1Y_{1.3}Gd_{0.7}Fe_5O_{12}$ were prepared by mixing bismuth nitrate solution, ferric nitrate solution, yttrium nitrate solution and gadollinium solution. Then, the prepared mixed solutions were dropped into ammonia solutions of about 10 liters maintained at 70° C. The dropping operation was performed with vibrations for effecting reactions evenly and finished for about 1 hours. After that, the coprecipitated slurry was heated and agitated for about 2 hours to mature the coprecipitated compounds.

Then, the generated slurry was separated and washed, and after that the washed slurry was dried up and calcined at 750° C. As a result, yttrium ferrite garnet powders, a part of which was substituted by bismuth and gadollinium, having garnetization rate of 100% were obtained. Then, the thus obtained powders were formed and sintered at 950° C. for 10 hours. Consequently, garnet sintered bodies with a single phase having a density of 99.9% were obtained.

Then, the thus obtained sintered bodies were machined into a shape having a thickness of 5 mm, a width of 10 mm and a length of 10 mm, and a mother single crystal was connected to the sintered bodies to which a heat treatment at 1000° C. was performed. As a result, the mother single crystal was grown by a distance more than 5 mm, and it was confirmed that the growth of single crystal was possible by the solid-phase reaction.

EXAMPLE 12

5 liters of solutions containing about 600 g of $Bi_1Y_2Fe_4Ga_1O_{12}$ were prepared by mixing bismuth nitrate solution, ferric nitrate solution, yttrium nitrate solution and gallium nitrate solution. Then, the prepared mixed solutions were dropped into solutions of about 10 liters maintained at 70° C. The dropping operation was performed with vibrations for effecting reactions evenly and finished for about 1 hour. After that, the coprecipitated slurry was heated and agitated for about 2 hours to mature the coprecipitated compounds.

Then, the generated slurry was separated and washed, and after that the washed slurry was dried up and calcined at 780° C. As a result, yttrium ferrite garnet powders, a part of which was substituted by bismuth and gallium, having garnetization rate of 100% were obtained. Then, the thus obtained powders were formed and sintered at 960° C. for 10 hours. Consequently, garnet sintered bodies with a single phase having a density of 99.9% were obtained.

Then, the thus obtained sintered bodies were machined into a shape having a thickness of 5 mm, a width of 10 mm and a length of 10 mm, and a mother single crystal was connected to the sintered bodies to which a heat treatment at 1000° C. was performed. As a result, the mother single crystal was grown by a distance more than 5 mm, and it was confirmed that the growth of single crystal was possible by the solid-phase reaction.

COMPARATIVE EXAMPLE 3

5 liters of solutions containing about 600 g of $Y_2BiFe_5O_{12}$ were prepared by mixing bismuth chloride, ferric nitrate and yttrium nitrate. Then, the slurry was produced in the same manner as that of Example 7, and the thus produced slurry was dried up and calcined.

In this calcining, garnetization does not occur at all if the calcining temperature was 800° C., and 95% of garnetization occurs if the calcining temperature was 950° C. Then, the thus obtained powders were formed and sintered at 1050° C. However, the sintered bodies had a density of 99.5% and a second phase (hematite phase) therein except for the garnet phase. By examining the sintered bodies, it was confirmed that Bi component was decreased from the start composition. Further, it was not possible to grow single crystals by the solid-phase reaction.

COMPARATIVE EXAMPLE 4

About 600 g of mixed powders were prepared by mixing bismuth oxide powders, ferrous oxide powders and yttrium oxide powders. The mixed powders were added into 600 g of water and further mixed in wet state by using a ball mill for 2 hours. Then, the mixed slurry was dried up and calcined.

In this calcining, garnetization does not occur at all if the calcining temperature was 800° C., and 80% of garnetization occurs if the calcining temperature was 1000° C. Then, the thus obtained powders were formed and sintered at 1050° C. However, the sintered bodies had a density of 99.0% and a second phase (hematite phase) therein except for the garnet phase. By examining the sintered bodies, it was confirmed that Bi component was decreased from the start composition. Further, it was not possible to grow single crystals by the solid-phase reaction.

The results of measurements are shown in Table 8 as well as average particle size.

TABLE 8

| | Average particle size(μm) | Sintering density |
|---|---|---|
| Example 10 | 0.7~0.8 | 99.9% |
| Example 11 | 0.7~0.8 | 99.9% |
| Example 12 | 0.6~1.2 | 99.9% |
| Comparative Example 3 | 1.5~1.6 | 99.5% |
| Comparative Example 4 | 2.0~2.1 | 99.0% |

As mentioned above, by using the ferrite powder producing methods according to the invention, since coprecipitation methods are selected corresponding to the compositions of garnet to be obtained, it is possible to obtain ferrite powders with garnet structure having good formability and good sinterability, which are preferably used for the ferrite crystal manufacturing methods according to the invention.

What is claimed is:

1. A method of manufacturing ferrite crystals with garnet structure, comprising the steps of:
   preparing first and second ferrite powders each having garnet structure, said powders having components, the molar percentages of which are higher and lower, respectively, than a target composition;
   mixing said first and second ferrite powders at a predetermined ratio to obtain a composition controlled ferrite powder such that the components of the composition controlled ferrite powder have molar percentages which are within 0.1 mol % of the target composition;
   forming said composition controlled ferrite powder to obtain a formed body;
   sintering said formed body to obtain a sintered body; and
   subjecting said sintered body to a hot isostatic pressing treatment to obtain a ferrite polycrystal body.

2. The method of claim 1, wherein said ferrite powders are manufactured by preparing mixed solutions containing at least ferrous ion and yttrium ion or rare earth metal ion, coprecipitating hydroxides with the aid of base from the mixed solution, synthesizing the coprecipitated compounds by oxidizing ferrous ion int ferric ion, and separating, drying and calcining the coprecipitated compounds.

3. The method of claim 1 wherein said ferrite powders are manufactured by preparing mixed solutions containing at least ferric nitrate and nitrate of yttrium or rare earth metal, dropping the mixed solution into a base solution to coprecipitate hydroxides, and separating, drying and calcining the coprecipitated compounds.

4. The method of claim 1 further comprising the steps of connecting a mother ferrite single crystal to said ferrite polycrystal body; and growing single crystal into said ferrite polycrystal body.

5. A method according to claim 4, wherein with respect to said single crystal growing step is effected a heat-treatment at 800~1600° C. under oxygen atmosphere in a normal pressure, a normal HIP treatment under Ar atmosphere in 100~2000 atm, and an oxygen HIP treatment under 0.1~20% oxygen atmosphere in 100~2000 atm.

6. The method of claim 1, wherein said hot isostatic pressing treatment is effected under ambient gases including an oxygen component greater than 0.1%.

7. A method of manufacturing ferrite crystals with garnet structure, comprising the steps of:
   preparing first and second ferrite powders each having garnet structure, said powders having components, the molar percentages of which are higher and lower, respectively, than a target composition;
   mixing said first and second ferrite powders at a predetermined ratio to obtain a composition controlled ferrite powder such that the components of the composition controlled ferrite powder have molar percentages which are within 0.05 mol % of the target composition;
   forming said composition controlled ferrite powder to obtain a formed body;
   sintering said formed body to obtain a sintered body; and
   subjecting said sintered body to a hot isostatic pressing treatment to obtain a ferrite polycrystal body.

* * * * *